Figure 2:
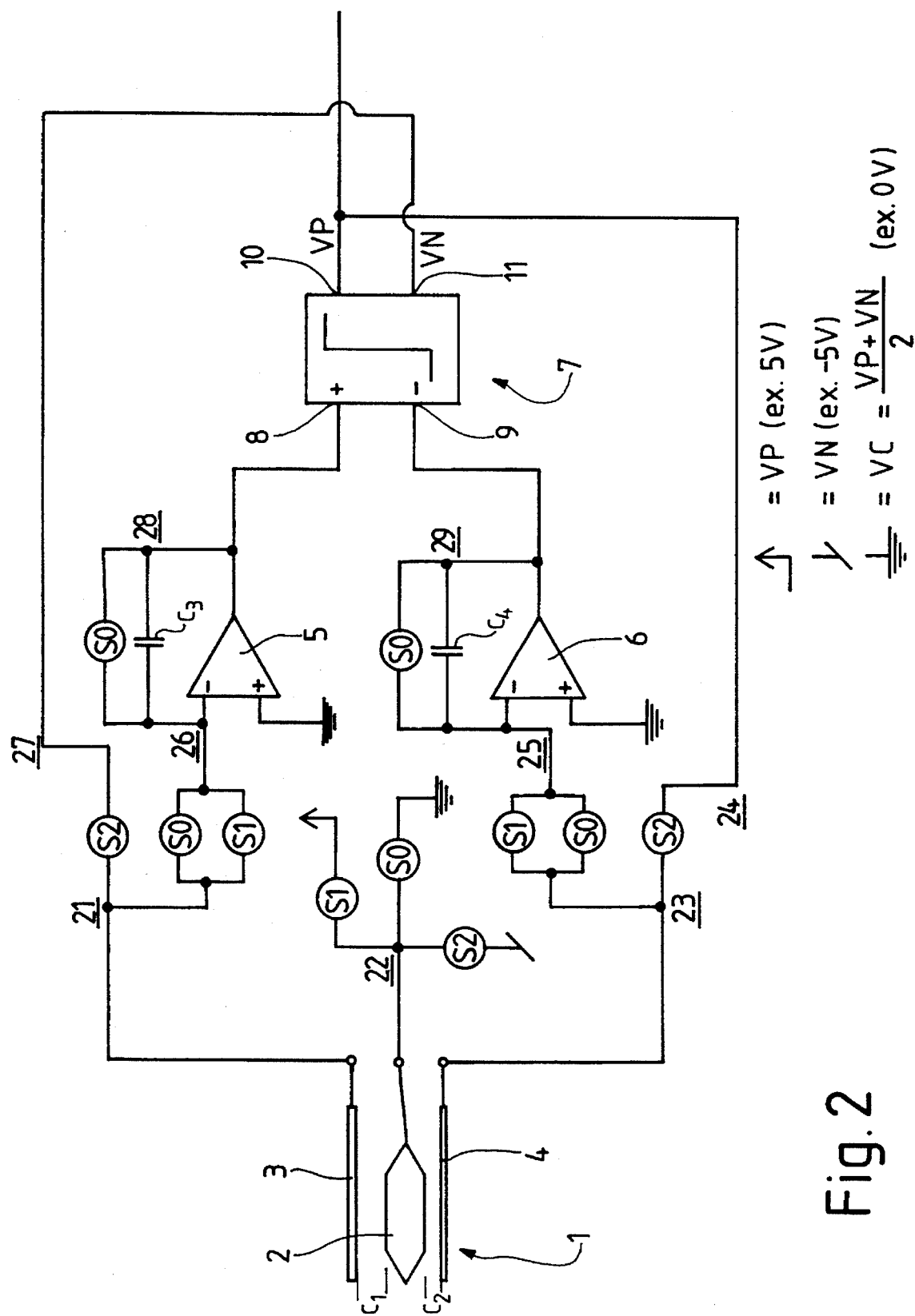

United States Patent [19]
Chevroulet et al.

[11] Patent Number: 5,454,266
[45] Date of Patent: Oct. 3, 1995

[54] FORCE MEASURING DEVICE

[75] Inventors: Michel A. Chevroulet, Neuchatel; Ted Smith, Wavre, both of Switzerland

[73] Assignee: CSEM Centre Suisse d'Electronique et de Microtechnique SA, Neuchatel, Switzerland

[21] Appl. No.: 130,180

[22] Filed: Oct. 1, 1993

[30] Foreign Application Priority Data

Oct. 2, 1992 [CH] Switzerland .......................... 03086/92
Oct. 21, 1992 [FR] France ................................ 92 12691

[51] Int. Cl.$^6$ ..................................................... G01P 15/00
[52] U.S. Cl. ........................................ 73/514.18; 73/514.35
[58] Field of Search ............................... 73/488, 517 R, 73/517 B

[56] References Cited

U.S. PATENT DOCUMENTS

| | | | |
|---|---|---|---|
| 4,930,043 | 5/1990 | Wiegand | 361/283 |
| 5,008,774 | 4/1991 | Bullis et al. | 73/517 R |
| 5,134,881 | 8/1992 | Henrion et al. | 73/517 R |
| 5,345,824 | 9/1994 | Sherman et al. | 73/517 B |

FOREIGN PATENT DOCUMENTS

| | | |
|---|---|---|
| 1583536 | 1/1981 | United Kingdom . |
| 8912830 | 12/1989 | WIPO . |

OTHER PUBLICATIONS

Sensors and Actuators—A Physical, vol A21, No. 1/3, Feb. 1990, pp. 316–319, Lausanne, CH; S. Suzuik et al. "Semiconductor Capacitance-Type Accelerometer with PWM Electrostatic Servo Technique".

*Primary Examiner*—Richard E. Chilcot, Jr.
*Assistant Examiner*—Max H. Noori
*Attorney, Agent, or Firm*—Griffin, Butler, Whisenhunt & Kurtossy

[57] ABSTRACT

The device for measuring a force, and notably an inertial force corresponding to an acceleration, comprises a capacitive detector comprising two capacitors, the difference between the capacitances of which is a function of the force measured.

The measuring device further comprises an electronic circuit permitting the creation of an output signal determined by a comparison of the value of the two capacitances. The signal is created in the form of a digital signal having a modulated pulse density.

5 Claims, 4 Drawing Sheets

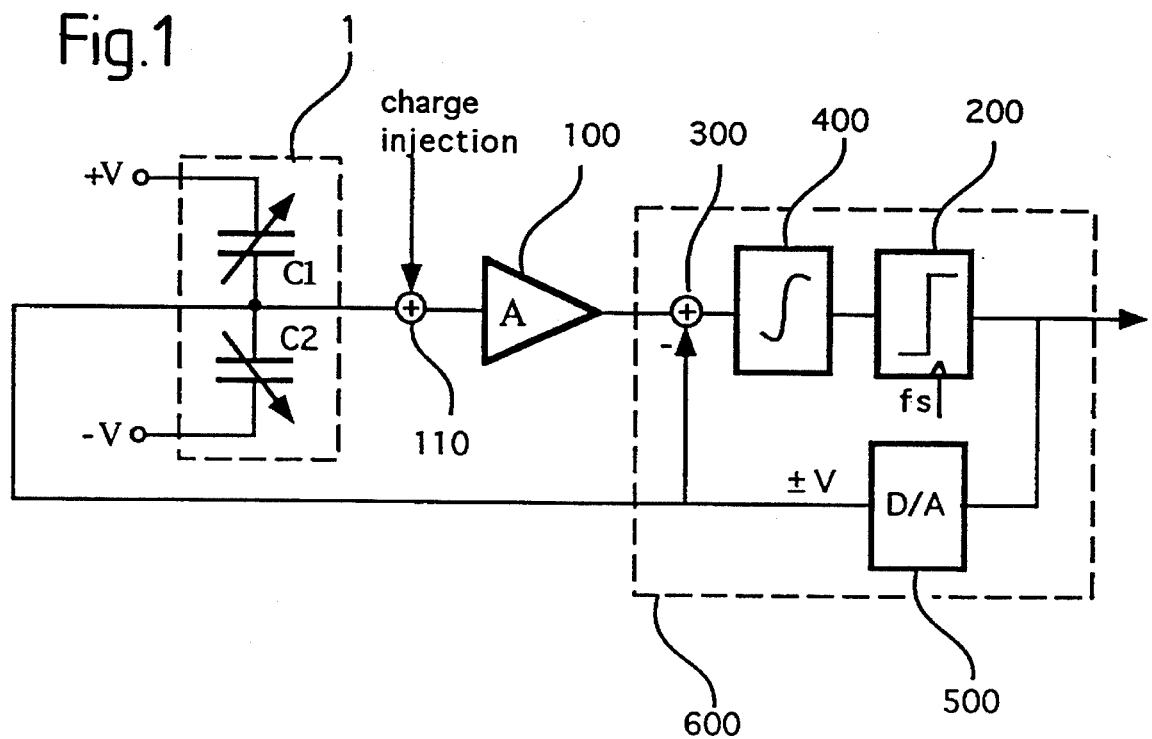
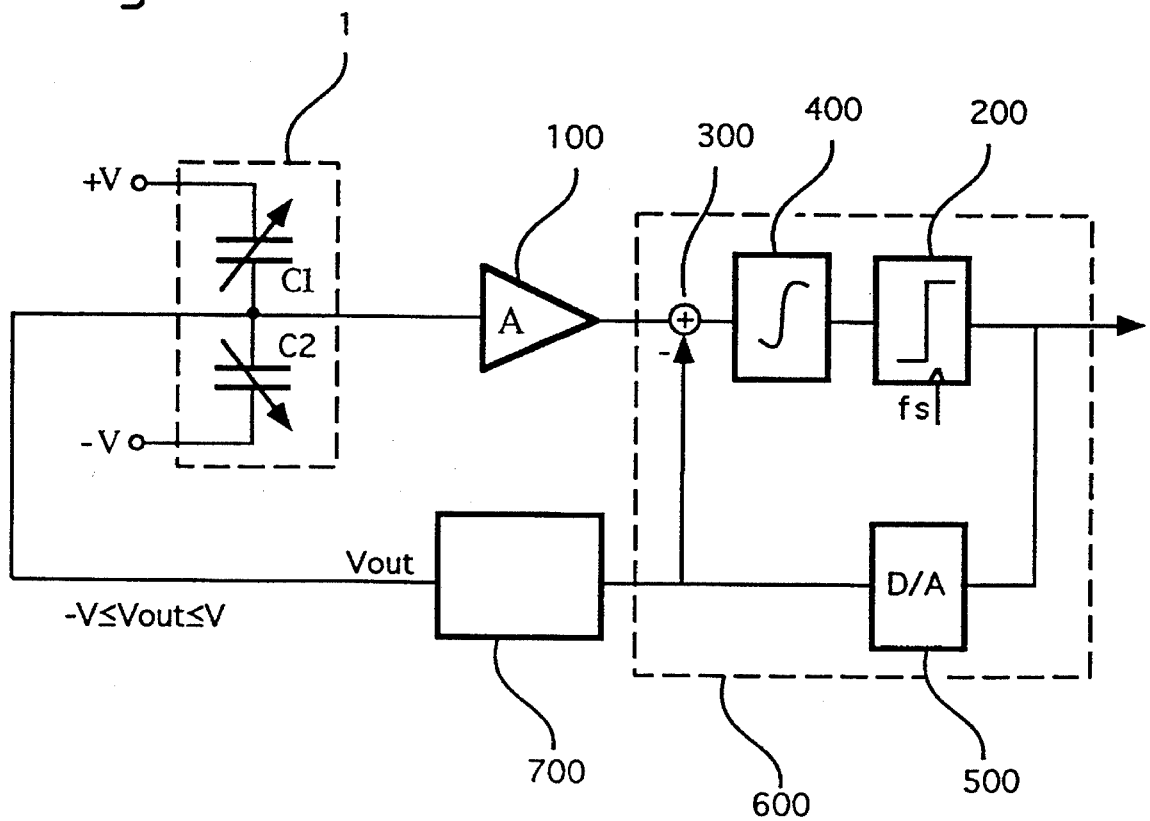

FORCE MEASURING DEVICE

The present invention concerns a device for measuring a force such as, for example, an inertial force corresponding to an acceleration of the device.

More precisely, the invention concerns such a measuring device in which the measured force acts on an elastically suspended mass forming one of the armatures of two capacitors.

The invention also relates to a capacitive sensor responsive to the force, as well as to electronic circuitry in combination with the sensor to produce analog or digital representations of the applied force signal.

A precision accelerometer based on a micromachined sensor and associated electronics is described in an article by W. Henrion et al. entitled "Wide Dynamic Range Direct Digital Accelerometer", IEEE Solid-State Sensors and Actuators Workshop, 1990" and in the U.S. Pat. No. 5,134,881.

The device of these two prior documents comprises a sensor in which an elastically suspended mass forms the mobile armature of two sensing capacitances and of two force capacitances. The said mobile mass is able to be submitted to a force that is desired to be measured so as to vary the capacitances of the sensing capacitors, and electronic means for supplying a signal representative of the difference between the two sensing capacitances. This signal is used as an output signal representative of the value of the said force and is also, applied to the two force capacitors, in order to create an electrostatic force capable of compensating for the external force acting on said mass.

In this prior solution, the capacitive sensor is characterized by the fact that the displacement signal is substantially proportional to the acceleration of the support structure for accelerations varying with a frequency inferior to the resonance frequency. Furthermore, this prior solution is based on a capacitive sensor which has electrically isolated force and sense conductive areas. Finally, the prior solution uses a charge generator for the generation of electrostatic forces.

Another characteristic of this prior art is that the measuring device with digital output is based on binary electrostatic forces.

Yet another characteristic of this digital output device is the integration means in the forward circuit.

Another characteristic of this digital output device is the lead-lag filter in the forward circuit for stabilisation of the control loop.

The prior art contributed by Henrion includes possible solutions for precision acceleration measurements. However, there remain three faults which need to be improved:

Firstly, the capacitive sensor with resonant frequency response requires an internal vacuum to ensure its resonant characteristics. During production, it is expensive to realise this vacuum, and to maintain it during the whole life of the device. It is therefore preferred to use a sensor with a higher internal pressure, e.g. in the millibar range, which is cheaper to realise and better controlled. Such a sensor will typically show a damped frequency response.

Secondly, integration means in the forward circuit will cause loop instability. US Patent 5,134,881 does not elaborate on the method or means for stabilisation.

Thirdly, distortion is not treated by the prior art, while multiple physical and electrical sources may deteriorate considerably a linear response of the measuring device.

Therefore, the primary object of the present invention is to realise a high precision measuring device responsive to a force signal.

Another object is to realise a high precision measuring device responsive to a force signal, based on a damped frequency response sensor.

Another object is to realise a high precision measuring device responsive to a force signal, based on a capacitive sensor with common sense and force conductive areas.

Yet another object is to realise a high precision measuring device responsive to a force signal including electronic means to obtain low distortion.

Still another object of the invention is to realise a high precision measuring device responsive to a force signal providing a digital output based on binary electrostatic forces.

Still another object of the invention is to realise a high precision measuring device responsive to a force signal providing a digital output based on multi-valued electrostatic forces.

The objects identified above as well as other features and advantages of the invention are incorporated in a device for measuring a force and notably an inertial force corresponding to an acceleration, comprising a capacitive detector in which an elasticly suspended mass forms the mobile armature of two capacitors, the said mobile mass being able to be submitted to the said force so as to vary the capacitances of said capacitors and forward circuit means comprising a circuit for supplying a signal in response to the displacement of said mass, said signal being used as an output signal representative of the value of said force, and feedback circuit means for applying said output signal through a switching arrangement to at least one of said capacitors for creating a electrostatic feedback force, characterized in that the said electronic means comprise means for creating the said signal in a digital form having the density of its pulses modulated as a function of said force.

Such a pulse density modulated signal is actually a digital signal. It can thus be supplied without an intervening circuit to any digital processing unit as long as the clock frequencies of the pulse density modulation means and those of the said digital processing unit are synchronized. The pulse density modulated signal can equally be supplied to a low-pass filter similar to that described in the above prior document in order to produce an analog signal. Finally, if the clock which regulates the modulation means and those of the digital processing system located downstream are not synchronised, a digital low-pass filter, that is to say a counter, can be used to directly transform the pulses received from the measuring device into pulses usable by the digital processing system.

According to a second preferred embodiment of the invention, the forward circuit means comprise integration means located at the output of the circuit responsive to the mass displacement. These integration means are characterized by at least one integrator, which increases the low-frequency loop gain. This improvement prevents the output signal from showing dead zones around the zero-force input signal, and certain other input signals, as was reported for purely electrical systems in the article by J. C. Candy and G. C. Temes "Oversampling Methods for A/D and D/A Converters" in Oversampled Delta-Sigma Converters, IEEE Press, pp. 1–29, 1992.

Also according to the second preferred embodiment of the invention, the integration means receive as there input a linear addition of the displacement signal and the output of said analog-to-digital converter, characterised in that the transfer function from input of the integration means to the digital output signal is negative of sign. According to a third preferred embodiment of the invention, the A/D conversion supplies a multi-bit digital word at each sampling moment. This can be realised by using a parallel A/D converter (flash-converter), or it can be realised using a cascade of more than one delta-sigma converters (see Candy and Temes). Accordingly, the D/A conversion in the electrostatic force feedback circuit needs to be adapted to the A/D converter used in the forward path.

According to a fourth preferred embodiment of the invention, a single bit A/D conversion is used to apply a multi-valued electrostatic force to the sensor by incorporating a low-pass filter in the electrostatic force feedback circuit.

Other characteristics and advantages of the invention will appear from the detailed description which follows of four particular embodiment of the present invention given solely as examples and described by referring to the attached drawings, in which:

FIG. 1 is a schematic diagram of a force measuring device according to the present invention, FIG. 2 is an electronic diagram of a first embodiment of the device of FIG. 1

Figure 3:
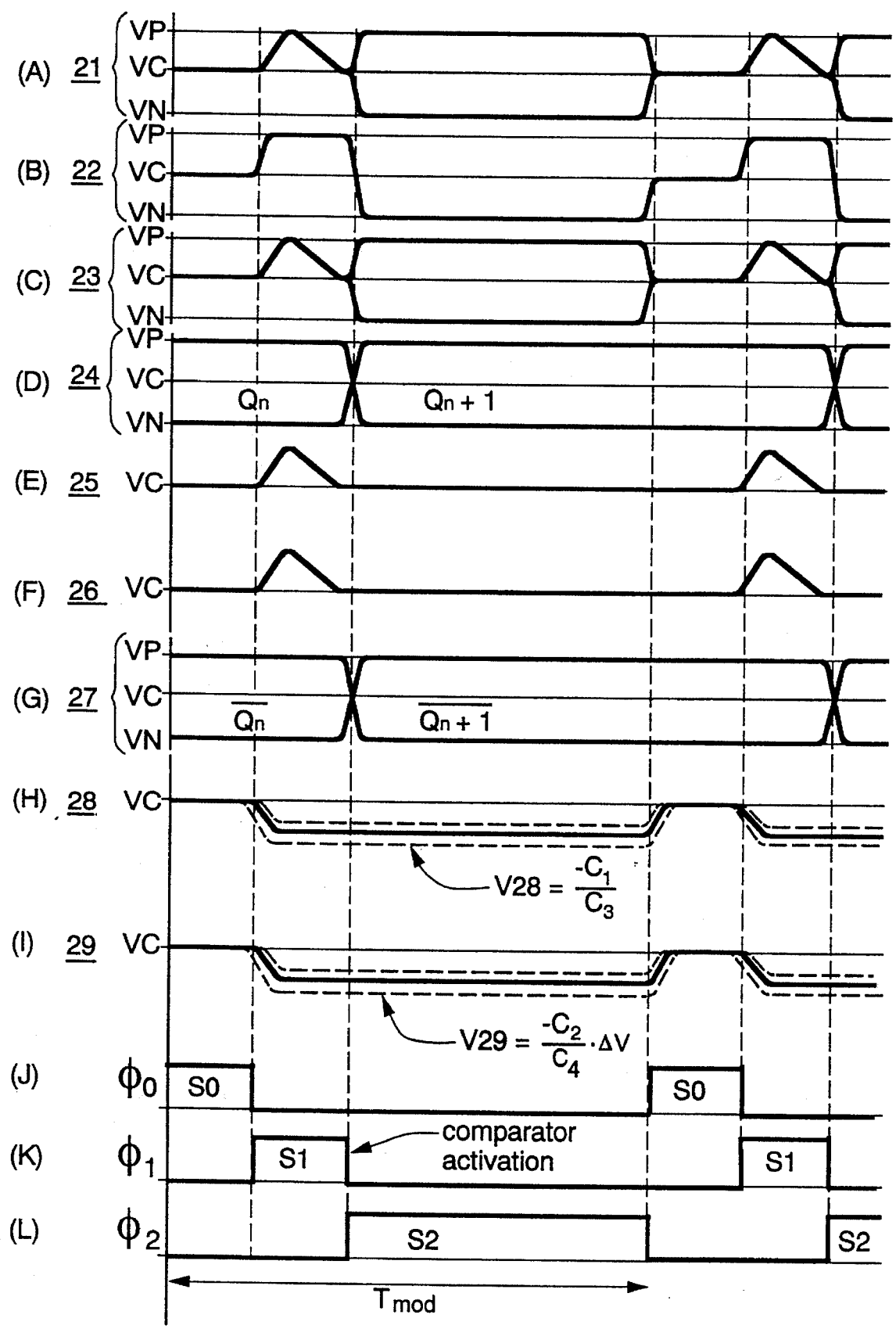
Figure 4:
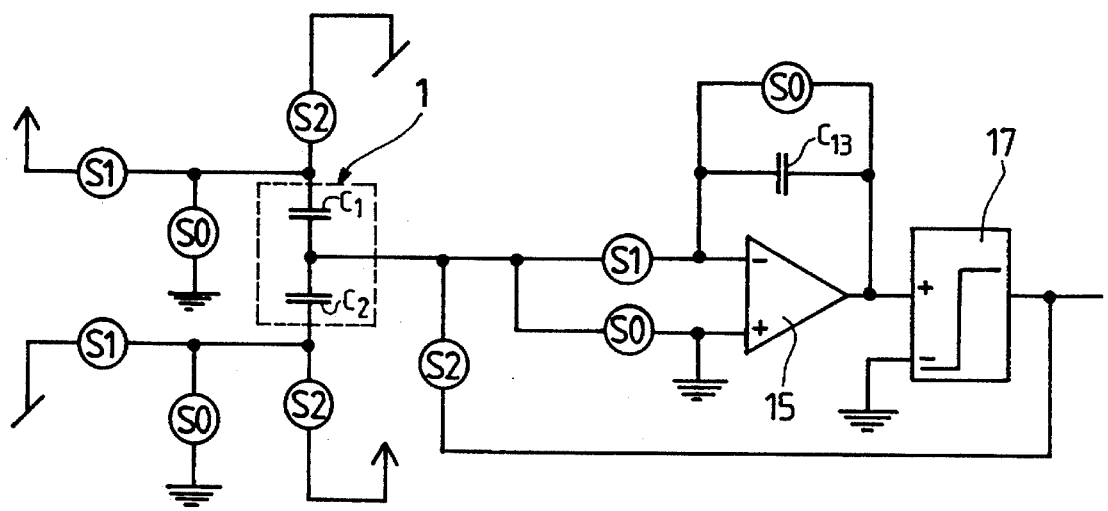
Figure 5:
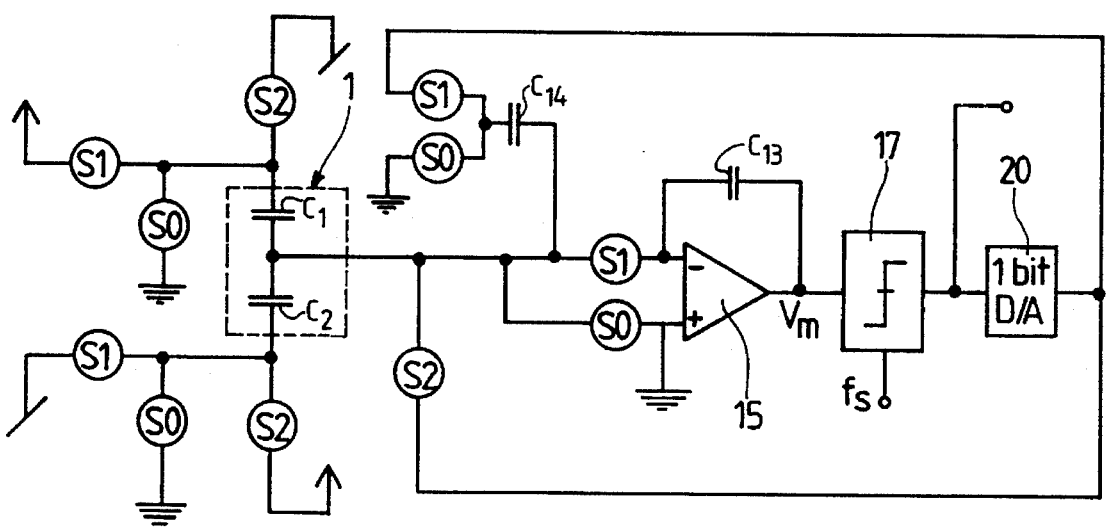

FIG. 3 is a timing diagram of the voltages measured at nine locations on the circuit shown in FIG. 2, and also at three outputs (not represented) of the clock controlling the device, FIG. 4 is an electronic diagram of a second embodiment of the force measuring device of the present invention, and FIG. 5 is an electronic diagram of a third embodiment of the force measuring device according to the present invention comprising an indicator at the output of the capacitive detector.

FIG. 6 shows another embodiment of the device of the invention;

FIG. 1 and 2 represent the electronic diagram of a first embodiment of a force measuring device according to the present invention. The device comprises a capacitive detector 1, the principle of which is already known to a skilled worker in the field. The detector includes a mobile conductive mass 2 elastically suspended between two fixed plates 3, 4. Under the effect of an exterior force and notably under the effect of an inertial force, the conductive mass or mobile electrode 2 can shift from its position of equilibrium situated midway between the two plates or fixed electrodes 3, 4. At equilibrium, that is to say in the absence of exterior forces, the capacitance C1 measured between the mobile electrode 2 and the first fixed electrode 3 is, in the present embodiment, theoretically equal to the capacitance C2 measured between the mobile electrode 2 and the second fixed electrode 4.

The signal representative of the position of the mobile electrode is fed to a circuit 100 acting as a charge amplifier. The output of circuit 100 is applied to a quantizing circuit 200 either directly or, optionally, through a combination circuit 300 and integration means 400. The output of the quantizing circuit 200, which is the output of the measuring device, is applied to a digital-to-analog converter 500. The output of the converter is connected to a second input of said combination circuit and to the mobile electrode. The arrangement of the combination circuit 300, integration means 400, quantizing circuit 200 and D/A converter is known as a sigma-delta modulator. The electrostatic force created on the mobile electrode by the voltage difference between the output signal of the D/A converter and reference voltages V+ and V−, is intended to compensate exactly for the external force applied to said mobile electrode. A disadvantage is that the generated force is modulated by the sensor mass position. Any permanent deviation from the central position, for example due to tolerances in the manufacturing process, will cause even order harmonic distortion in the output signal. A deviation from the central position is unavoidable in practical realisations, since it is caused by the total resulting offset of the whole control loop. Local electronic offset corrections at any of the functional blocks in the loop results in a complex system and is not applicable for the sensor offsets. It is therefore preferred to have a global offset calibration. This can be realised by several means, which all refer to adding a calibrated signal to the forward path signal or to the feedback path signal. A first solution is to add an amount of fixed charges to the charges read from the sensor during mass position measurement (see reference 110 in FIG. 1). A second solution is to add a calibrated signal at the output of the charge amplifier circuit 100. Another solution is to add a calibrated digital signal to the output of the quantizing circuit in the forward path. Still another solution is to add a calibrated signal to the feedback path. It is also possible to make the said calibrated signal dependent of another signal, for instance of a signal representative of temperature.

When under the effect of an acceleration of the system for example, the mobile electrode 2 shifts from its equilibrium position, the distance which separates it from one of the fixed electrodes reduces, while the distance which separates it from the other increases. In this condition, the capacitance C1 measured between the mobile electrode and the first fixed electrode grows whilst the other capacitance becomes smaller. It can thus be seen that the difference between the two capacitances C1 and C2 is a function of the offset between the position which the mobile electrode 2 occupies and its equilibrium position, and that this difference is thus also a function of the exterior force exerted on the mobile electrode 2.

The device is, as has previously been stated, a regulated digital system with a period which is a multiple of the period of a clock (not represented) connected to the device.

Referring now to the embodiment of FIG. 2, each period or cycle of the operation of the device is divided into three phases or steps designated respectively by S0, S1 and S2, the sequence of these three phases being controlled by the signals Ø0, Ø1 and Ø2 (FIG. 3) supplied by the clock (via conductors not represented). These signals are supplied to a certain number of switches to control them in a manner so that each one of them is closed during one of the three phases of the operating cycle and is open during the other two phases (these switches are represented in FIG. 2 by one of the indications S0, S1 or S2 in a cycle, according to whichever is closed during the phase S0, S1 or S2 respectively). Of course, in practice the switches can be formed by the transistors of an integrated circuit by which the circuit is materialized.

FIG. 3 comprises twelve plots representing the temporal evolution of twelve signals. The nine primary plots describe the temporal evolution of the voltages V21, V22 ... V29 measured at nine locations on the circuit represented in FIG. 2, these nine locations being referenced in FIG. 2 by the FIGS. 21 to 29. The three final plots of FIG. 3 represent the temporal evolution of the signals Ø0, Ø1 and Ø2 supplied by the clock.

By now examining together the circuit diagram of FIG. 2 and the evolution of the voltages V22 to V29, described by the plots of FIG. 3, during the different phases comprising a period of operation of the device, it can be seen that during the phase S0, the mobile electrode 2 is connected to the ground whilst the two fixed electrodes 3 and 4 are respectively connected to the inverting input of each of the amplifiers 5 and 6. It can also be seen that the output of each amplifier 5 and 6 is short-circuited with the inverting input and that the second input of each amplifier is connected to the ground. In these conditions, the current and the voltages will be negligible everywhere in the circuit, which corresponds with that indicated by FIG. 3 where it can be seen that each of the voltages V21 to V29 is negligible during the phase S0.

The following phase S1 in the cycle corresponds to the measuring phase of the position of the mobile electrode 2. At the start of this phase S1, each of the switches referenced S0 are open and the three switches referenced S1 are closed in this condition, the mobile electrode 2 is connected to a positive supply voltage and is thus at a reference voltage VP. The two fixed electrodes 3 and 4 are, as during the preceding phase, each connected to the inverting input of one of the amplifiers 5 and 6. During this phase S1, the output of each amplifier is connected to its inverting input by a capacitor C3 and C4. In fact, there is no longer a short-circuit because the switch S0 next to each capacitor is now open. With such a configuration, we can be seen that, according to what is showing FIG. 3, the plates 3 and 4 of the capacitors C1 and C2 will charged under the effect of the increase in the potential VP of the mobile electrode 2. The voltage which is responsible for the flow of charge towards the plates 3 and 4 of the capacitors C1 and C2 will also produce a difference in the potentials between the two inputs of each operational amplifier 5 and 6. The amplifiers will thus emit current whilst this difference in potential exists. The current will charge the capacitors C3 and C4 until the voltage between the input of the amplifiers is once again negligible. At this moment the voltages V28 and V29 at the outputs of the two amplifiers 5 and 6 respectively will be determined by the two following relations:

$$dV \times C1 = V28 \times C3$$

$$dV \times C2 = V29 \times C4$$

The capacitors C3 and C4 being chosen to have the same value of capacitance, the measured voltages V28 and V29 will be respectively proportional to the capacitances of the capacitors C1 and C2. As can be seen from FIG. 2, the voltages V28 and V29 at the output of the amplifiers 5 and 6 are supplied to the input of a comparator 7. In the embodiment described here, the comparator used is a one bit analog-digital converter of a type well known to a skilled worker in the field.

At the moment of transition from the second phase S1 to the third phase S2, the comparator evaluates the respective levels of the signals that it receives at its inputs and emits from its direct output 10 a high signal (having a level VP) if the voltage V28 is greater than the voltage V29 and a low signal (having a level Vc) if not. The comparator emits simultaneously from its inverted output 11 a signal having a level Vc if the voltage V28 is greater than the voltage V29 and a signal having a level VN otherwise. The signal supplied by the comparators 7 constitutes the usable signal at the output of the device and also serves to create an electrostatic force during the third phase S2 of each operating period of the device, to bring back the mobile electrode 2 constituting one of the armatures of each of the capacitors C1 and C2 into its rest position in which the capacitances of the capacitors C1 and C2 have equal values.

The third phase S2 of the operating cycle of the device is, as has just been described, a phase of compensation of the external forces exerted on the mobile mass 2. The switches referenced S1 which were closed during the preceding phase are now open and three switches referenced S2 are now closed. With this circuit connexion, the mobile electrode 2 has a negative reference voltage VN whilst the fixed electrode 3 of the capacitor C1 is connected to the inverted output 11 of the comparator 7 and the fixed electrode 4 of the capacitor C2 is connected to the principal output 10 of the comparator. In these conditions and during the transition from the phase S1 to the phase S2, if the value of the measured capacitance of the capacitor C1 is, for example, greater than the value of the capacitance of the capacitor C2, the fixed electrode 3 of the capacitor C1 would be placed at the potential VN whilst the fixed electrode 4 of the capacitor C2 would be placed at the potential VP. The electric field between the electrodes 2 and 3, both at the potential VN, will thus be negligible whilst the plate 4 of the capacitor C2, being at the potential VP, will exert an attractive force on the mobile electrode 2. This force will tend to increase the distance between the electrodes 2 and 3 and reduce the distance between the electrodes 2 and 4 and will thus act to equalize these distances and simultaneously equalize the values of the capacitances associated therewith. When an exterior force shifts the mass 2 from its equilibrium position, the electrostatic force which has just been described will constitute a return force which will be added to the elastic return force of the detector. The return constant K tends to bring the mobile electrode of the capacitive detector towards its equilibrium position thus comprises a mechanical component and an electrical component, this second component being able to be much greater than the first.

During the third phase S2 of each of the cycle of the device, the mobile mass 2 of the capacitive detector is submitted to an electrostatic force in one direction or the other, even if the device measures no exterior forces for which the effect must be compensated. The reason for this is that the comparator supplies during each cycle either a high signal or a low signal and it thus also produces at each cycle an electrostatic return force on the mobile mass 2. The parasitic effect of this return force will, in the absence of an exterior compensating force be cancelled during the following cycle when the comparator supplies a voltage producing a force in the opposite direction. In the absence of an exterior force, the detector thus emits a rectangular signal which is high for exactly one period in two.

In the embodiment of the present invention described above, the measurement of the position of the mobile electrode is realised by placing it at a given potential and then by measuring the quantity of charge which has accumulated at the two fixed electrodes under the effect of the voltage thus produced between them and the mobile electrode. In these conditions, the measurement of the position is called measurement of the position at a constant voltage. In an equivalent manner, a measurement of the position at a constant charge can be realized. To this effect, all circulation of electric current is forbidden from or towards the fixed electrodes and the potential of the electrodes is measured with respect to earth.

The electric circuit represented by the diagram of FIG. 4 corresponds to another embodiment of the present invention. The capacitive detector 1 used in this second embodiment may be identical to that used with the first embodiment. However, to measure the position of the mobile electrode, instead of putting this at a fixed reference potential and then measuring the amount of charge which accumulates in the fixed electrodes, one puts the two fixed electrodes at given reference potential which have opposite signs and the quantity of charge which has been accumulated in the mobile electrode is measured. The principle of operation of the electronic circuit itself is very similar to that of the circuit of FIG. 2. In particular, the voltage that can be measured at the base of the mobile electrode has a behaviour qualitatively identical to the behaviours of the voltages described by the traces 21 and 23 (FIG. 3). The sole difference being that here, the voltage can be either negative or positive according to whether the mobile electrode shifts from its position towards respectively the first or the second fixed electrode. In addition, the voltage measured at the output of the amplifier 15 has a behaviour qualitatively identical to the voltages represented by the plots 28 and 29 (FIG. 3) except as concerns the sign of the voltage, this being able to be either positive or negative according to whether the capacitance of the capacitor C1 is greater than the capacitance of the capacitor C2 or whether the inverse is true. If the voltage supplied to the input of the comparator at the end of phase S1 is designated by VM, a reasoning identical to that effectuated for the voltages represented by the plots 28 and 29 gives the following relation:

$$VM = \frac{C1 - C2}{C13} (VP - VC)$$

The part of the electrical diagram of FIG. 4 which is constituted by the amplifier 15, the capacitor C13 and the conductors associated therewith constitute an integrator. If the operating cycle of the device did not comprise a phase S0 during which the two terminals of the capacitor C13 were short-circuited, the voltage at the said terminals would be able to grow in an unlimited manner an thus cause the saturation of the device. The use of a commutator (S0) to short-circuit the terminals of the capacitor C13 nevertheless cause an inconvenience. In fact, the gain of the amplifier 15 and the value of the capacitance 13 being selected so as to eliminate all risk of saturation during the duration of a phase S0 even is the presence of a relatively important acceleration, the voltage produced at the integrater output at the end of a phase S1 will be very small when the acceleration measured is small. In these conditions, the system in its entirety may not have a sensitivity sufficient to be able to detect this very small acceleration. A threshold of sensitivity of the device would be thus observed in this case, below which the acceleration is not sufficient to be measured. Such a threshold may be troublesome in certain applications.

The embodiment of the present invention shown by the electrical diagram of FIG. 5 does not have the inconvenience which have just been described. By comparing this diagram with that of FIG. 4, it will be noted that the commutator (S0) acting to short-circuit the terminals of the capacitor S13 during the phase S0 has been omitted. To nevertheless avoid the saturation of the integrator, a supplementary negative feed-back line has been added starting from the output of the comparator and acting on the inverting input of the amplifier 15. This feed-back loop comprises a pair of commutators S0 and S1 and a capacitor C14 or alternatively, this combination of a capacitor and two commutators may, as is well known by a skilled worker in the field, be replaced by a resistance. It will be also seen from the FIG. 4 that the feed-back loop additionally comprises a digital—analog converter 20. The presence of this element is optional in the embodiment described here; in fact, the output signal of the said element will be, in principle, identical to that received at the input, except for a possible effect of amplification. However, the presence of the digital analog converter is necessary as soon as one considers a second variation of the present embodiment in which the one bit comparator is replaced by a multi-bit analog—digital converter according to what will be described further on in the description.

Whichever of the variations of the embodiment we are concerned with, one can easily calculate the change in the level of the voltage VM supplied to the input of the comparator 17, which also corresponds to the voltage at the terminals of the capacitor 13, between a cycle of the device and the following cycle. This variation ΔVM of the voltage VM will depend here upon the voltage VA supplied by the comparator 17 or, as the case may be, by the digital-to-analog converter 20. The variation in the voltage VM is given by:

$$\Delta VM = \frac{C1 - C2}{C13} (VP - VC) - \frac{C14}{C13} VA$$

The feed-back term (the furthest to the right in the above mathematical relation) prevents the saturation of the integrator. Tests performed on prototypes have shown that the circuit which has just been described eliminates the threshold of sensitivity around 0 which constituted a fault in the embodiment described further above.

Another advantageous characteristics which a force measuring device according to the invention may have is, as has just been mentioned, constituted by the use of a multi-bit converter 17 in the place of the one bit comparator 17 described further above. Such a multi-bit comparator is a device well known to a skilled worker in the field, however its use in a force measuring device according to the present invention provides some surprising advantages. The main advantage linked to the use of a multi-bit converter is relative to the determination of the electrostatic force for compensating the exterior forces which are exerted on the mobile electrode. When the system uses a one bit comparator, the electrostatic feed-back force each cycle has an equal intensity, only the direction of this force being determined by the comparator at each cycle. In these conditions, the system must necessarily, to maintain the mobile electrode close to its equilibrium position, operate at a very high frequence. The electrostatic force created by the capacitor supplying work at each cycle, the energy consumption of the device is considerable, this consumption being in addition proportional to the clock frequency. The use of a converter supplying at its output a multi-bit signal allows the creation of an electrostatic feed-back signal, the response of which is adapted to the degree of displacement of the mobile electrode with respect to its equilibrium position. Due to this feedback, which may be modulated according to the need, the stability of the system may be assured even with a device the operating frequency of which is much weaker than that necessary in a one bit system. The use of a much weaker frequency thus results in a considerable economy of energy.

The use of a multi-bit converter also presents the advantage of lowering the threshold of sensitivity which was referred to above. Once again it will be understood that even if the use of a multi-bit converter has only been described in relation with FIG. 5, this improvement is not only limited to the embodiment described in that figure.

The operating schematic of the device for measuring a force according to the present invention is topologically similar to a schematic of a second order sigma-delta converter, or another words a sigma-delta converter, the loop of which comprises two integrations. In the device according to the present invention, the first integration is effectuated mechanically by the detector itself whilst the second integration is realised by the electronic integrator. The capacitive detector 1 performs, in series, two integrations but, by the presence between the plates of the capacitive detector of air or another gas, a considerable damping of movement is produced. The strong damping of the system removes one of the poles of the loop. This analogy with a sigma-delta converter enable the consideration of a force measuring device according to the present invention comprising a one bit comparator, as being a second order sigma-delta converter which is strongly oversampled (with respect to the pass band), whilst a force measuring device according to the present invention comprising a multi-bit converter corresponds simply to an oversampled second order sigma-delta converter.

Binary coding of the electrostatic force signal has a disadvantage from the point of view of energy dissipation. The application of a binary force signal implies the charging and discharging of the sensor capacitors at a high frequency compared to the signal frequency. On the average, however, the net amount of supplied charges to the sensor is often small. The solution is to reduce the sampling frequency while maintaining high resolution of the electrostatic forces. Hence, a multi-valued force need to be generated. This can be done in two ways. The first method is based on quantizing the forward path signal in more than one bit using a multi-bit A/D converter. The multi-valued electrostatic force is found after conversion of this multi-bit digital word by a multi-bit D/A converter. The second method is based on binary coded output signal which is passed through a low-pass filter 700 in the feedback path (see FIG. 6). The cut-off frequency of the low-pass filter should be below the sampling frequency, and above the highest input signal frequency.

We claim:

1. Device for measuring a force and notably an inertial force corresponding to an acceleration, comprising:

a capacitive detector comprising two capacitors and in which an elastically suspended mass forms a mobile armature of at least one of said capacitors, said mobile mass being able to be submitted to said force so as to vary the capacitance of at least one of said capacitors;

forward circuit means comprising a circuit for supplying a signal in response to the displacement of said mass, said signal being used as an output signal representative of the value of said force; and, feedback circuit means for applying said output signal through a switching arrangement to at Least one of said capacitors for creating an electrostatic feedback force characterized in that:

said forward circuit means comprise means for creating said signal in digital form having a pulse density which is modulated as a function of said force said forward circuit means comprise integration means situated after the output of the capacitive detector, said integration means comprising at least one electronic integrator, the input of said integration means are arranged for receiving a linear addition of the output signal of said capacitive detector and of said signal created in digital form, the sign of the transfer function of the feedback loop thus formed through the input of said integration means and the output said forward circuit means being negative.

2. Device for measuring a force and notably an inertial force corresponding to an acceleration, comprising:

a capacitive detector comprising two capacitors and in which an elastically suspended mass forms the mobile armature of at least one of said capacitors, said mobile mass being able to be submitted to said force so as to vary the capacitance of at least one of said capacitors;

forward circuit means comprising a circuit for supplying a signal in response to the displacement of said mass, said signal being used as an output signal representative of the value of said force; and, feedback circuit means for applying said output signal through a switching arrangement to at least one of said capacitors for creating an electrostatic feedback force;

characterized in that said forward circuit means comprise means for creating said signal in digital form having a pulse density which is modulated as a function of said force, and further characterized in that said means for creating said signal in digital form comprise a one bit comparator.

3. Device for measuring a force according to claim 2, characterized in that said feedback circuit means comprise a low-pass filter for transforming said signal in digital form into a multi-valued feedback signal.

4. Device for measuring a force and notably an inertial force corresponding to an acceleration, comprising:

a capacitive detector comprising two capacitors and in which an elastically suspended mass forms the mobile armature of at least one of said capacitors, said mobile mass being able to be submitted to said force so as to vary the capacitance of at least one of said capacitors;

forward circuit means comprising a circuit for supplying a signal in response to the displacement of said mass, said signal being used as an output signal representative of the value of said force; and, feedback circuit means for applying said output signal through a switching arrangement to at least one of said capacitors for creating an electrostatic feedback force;

characterized in that said forward circuit means comprise means for creating said signal in digital form having a pulse density which is modulated as a function of said force and further characterized in that said means for creating said signal in digital form comprise a multi-bit converter.

5. Device for measuring a force and notably an inertial force corresponding to an acceleration, comprising:

a capacitive detector comprising two capacitors and in which an elastically suspended mass forms the mobile armature of at least one of said capacitors, said mobile mass being able to be submitted to said force so as to vary the capacitance of at least one of said capacitors;

forward circuit means comprising a circuit for supplying a signal in response to the displacement of said mass, said signal being used as an output signal representative of the value of said force; and, feedback circuit means for applying said Output signal through a switching arrangement to at least one of said capacitors for creating an electrostatic feedback force;

characterized in that said forward circuit means comprise means for creating said signal in digital form having a pulse density which is modulated as a function of said force, and further characterized in that it comprises global offset compensation means for supplying a calibrated signal and for adding said calibrated signal to the signal in said forward circuit means or in said feedback circuit means.

* * * * *